United States Patent Office 3,491,411
Patented Jan. 27, 1970

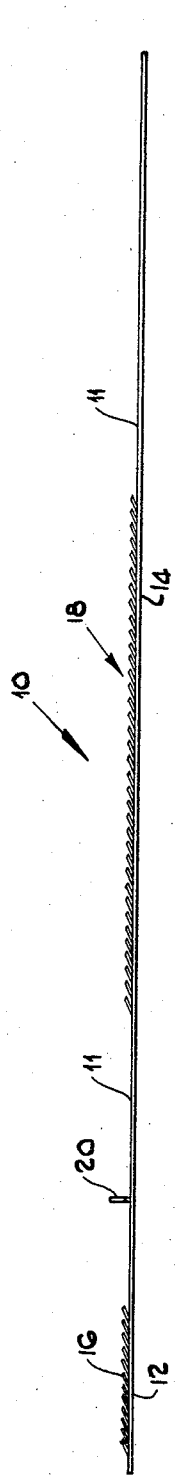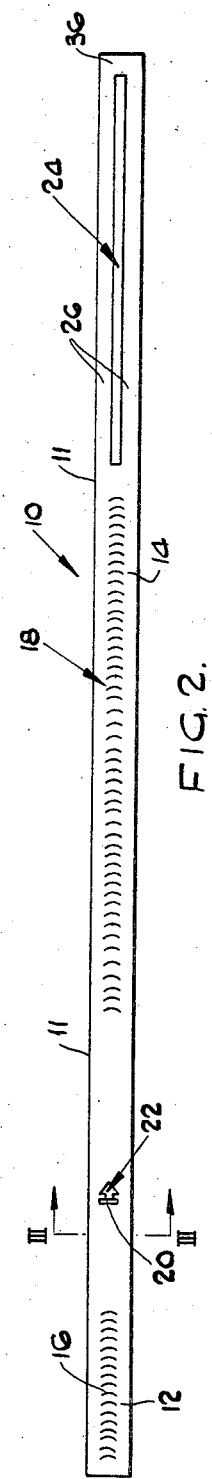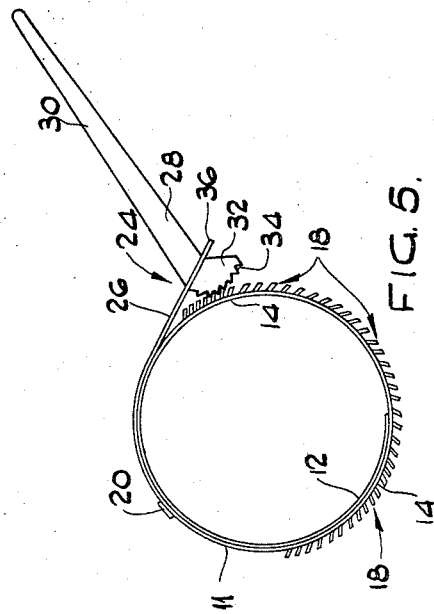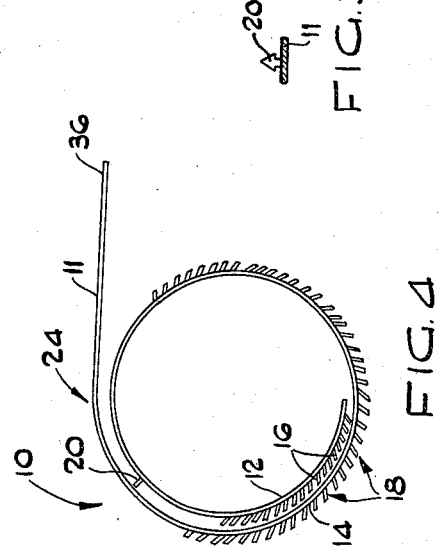

3,491,411
HOSE CLIP AND TOOL FOR FITTING THE HOSE CLIP
Arthur Owen Basson, 1233 South St., Hatfield, Pretoria, Transvaal, Republic of South Africa
Filed Mar. 4, 1968, Ser. No. 709,982
Claims priority, application Republic of South Africa, Apr. 7, 1967, 67/2,016
Int. Cl. B65d 63/02
U.S. Cl. 24—20          5 Claims

ABSTRACT OF THE DISCLOSURE

The hose clip disclosed herein comprises a band which can be spirally coiled around a hose. The band has end regions which overlap one another when the band is in position around a hose. There are provided one or more lugs on the band to maintain the band in a spirally coiled condition. On the end regions are provided interengaging tongue and groove formations to lock the band around the hose.

The tool disclosed herein for fitting the hose clip comprises an L-shaped lever which is arranged to engage the overlapping end regions of the hose clip and to tighten the clip when the lever is reciprocated.

BACKGROUND OF THE INVENTION

The invention relates to a hose clip and to a tool for fitting such a clip.

A problem with hose clips in the form of bands which are known to the applicant, is that a screw or a bolt and nut is required to lock the band around a hose.

It is an object of this invention to provide a hose clip in which the necessity for providing a screw or bolt and nut to fasten the hose clip around a hose is eliminated.

SUMMARY OF THE INVENTION

According to the invention, there is provided a hose clip comprising a band adapted to be spirally coiled around a hose and having end regions to overlap one another, and locating means for locating the end regions with respect to one another to maintain the band in a spirally coiled condition, the end regions having interengaging formations comprising tongue formations longitudinally spaced along one end region and grooves longitudinally spaced along the other end region within which at least one tongue formation may engage.

The longitudinal spacing of the tongue formations may be different from the longitudinal spacing of the grooves so that at least one tongue formation will engage within a groove as the band is tightened around a hose.

Conveniently, the tongue formations may slope relative to the end region of the band on which they are provided to permit relative movement of the end regions for the tightening of the band around a hose, but to prevent relative movement of the end regions in an opposite direction.

If desired, the tongue formations may be detents which may be pressed out of the band.

The locating means may comprise one or more lugs projecting from the band which may be headed and which may be adapted to engage with an aperture through the band and spaced longitudinally from the or each lug. Conveniently, the apertures is a slotted aperture which can be widened by flexing the sides of the band defining the aperture to permit the or each lug to be passed therethrough.

Further according to the invention, there is provided a tool suitable for fitting a hose clip as above defined, around a hose, the tool comprising an L-shaped lever in which one leg is a handle and in which the other leg is provided with formations adapted to engage with mating formations on the hose clip, the lever being adapted to engage a fulcrum provided on the hose clip and upon reciprocation of the handle to tighten the hose clip around a hose through the engagement of the formations on the lever with the mating formations on the hose clip.

The formations on the lever may be tooth formations and may be provided on a curved part of the lever.

Further according to the invention, there is provided a method of manufacturing a hose clip as defined, which includes pressing the hose clip out of a strip of sheet material.

The invention extends also to a hose clip whenever produced in accordance with the method of manufacture.

The invention is described below with reference to the accompanying drawings showing, by way of example only, a particular embodiment of the invention.

In the drawings:

FIGURE 1 shows a side view of a hose clip in an unfolded condition;

FIGURE 2 shows a plan view of the hose clip shown in FIGURE 1;

FIGURE 3 shows a section on line III—III of FIGURE 2;

FIGURE 4 shows a side view of the hose clip shown in FIGURE 1 in a spirally coiled condition; and FIGURE 5 shows the hose clip shown in FIGURE 4 being tightened by means of a tightening tool.

Referring to FIGURES 1 and 2 of the drawings, reference numeral 10 indicates generally a hose clip comprising a band 11 having end regions 12 and 14 capable of overlapping one another as shown in FIGURE 4 of the drawings. The end region 12 has a series of longitudinally spaced tongue formations 16, and the other end region 14 has a series of longitudinally spaced grooves 18 within which one or more of the tongue formations may engage. The longitudinal spacing of the tongue formations 16 is different from the longitudinal spacing of the grooves 18, so that at least one tongue formation is engaged within a groove during each small displacement of the end region 14 over the end region 12 as the band 11 is tightened around the hose.

The tongue formations 16 slope relative to the end region 12 on which they are provided. The tongue formations 16 slope away from the end region 12, whereby when the band 11 is tightened around a hose, relative movement is permitted between the end regions 12 and 14 to allow the band to be tightened, but relative opposite movement between the regions is prevented.

Adjacent the end region 12 there is provided one or more lugs 20 which are pressed out of the band 11, thus leaving an aperture 22 in the band. The lug 20 has a headed formation shaped in the form of an arrow head, and it is adapted to engage a slotted aperture 24 which is provided adjacent the end region 14. In order to insert the lug 20, through the aperture 24, the aperture 24 is widened by flexing the sides 26 of the band 11, defining the aperture 24. In FIGURE 4, the lug 20 is shown about to be inserted into the aperture 24, and in FIGURE 5 it is shown after being passed through the aperture 24 and after being bent over.

Referring to FIGURE 4, the band 11 is shown in a spirally coiled condition in which it is passed around a hose before being tightened around the hose.

Referring to FIGURE 5, the hose clip 10 is shown being tightened by means of a tool 28. The tool 28 is L-shaped and has a handle 30 and a transverse part 32. The transverse part 32 has a curved region along which tooth formations 34 are provided which are capable of engaging the grooves 18.

In use, the band 11 is spirally coiled as shown in FIGURE 4, and is passed around a hose. The handle 30 of the tool 28 is passed through the slotted aperture 24 and by using the end 36 of the band 11 as a fulcrum, the handle 30 is reciprocated. During the reciprocation of the handle 30, the tooth formations 34 engage the grooves 18 and move the end region 14 relative to the end region 12, whereby the band 11 is tightened around a hose. The sloping tongue formations 16 on the end region 12 which engage the groove 18 in the end region 14, prevent the band 11 from expanding under the pressure of the hose, around which it is tightened. As the handle 30 is substantially longer than the transverse part 32, leverage is provided for exerting the necessary force on the band part 36 to tighten the band 11 around a hose.

A hose clip 10 may be manufactured by pressing the band 11, the tongue formations 16, the grooves 18 and the lug 20 from a length of strip material, e.g. of metal.

I claim:

1. A hose clip comprising a band adapted to be spirally coiled around a hose and having end regions to overlap one another and locating means for locating the end regions with respect to one another to maintain the band in a spirally coiled condition, the end regions having inter-engaging formations comprising tongue formations longitudinally spaced along one end region and grooves longitudinally spaced along the other end region within which at least one tongue formation may engage, the longitudinal spacing of the tongue formations being different from the longitudinal spacing of the grooves, so that at least one tongue formation will engage within a groove as the band is tightened around a hose.

2. A hose clip according to claim 1, in which the locating means comprises at least one lug projecting from the band and which is adapted to engage with an aperture through the band and spaced longitudinally from the lug.

3. A hose clip according to claim 2, in which the lug is headed and is a detent pressed out of the band.

4. A hose clip according to claim 2, in which the aperture is a slotted aperture which can be widened by flexing the sides of the band defining the aperture to permit the lug to be passed therethrough.

5. A tool suitable for fitting a hose clip as claimed in claim 1, around a hose, the tool being of a unitary construction comprising a handle and an end portion provided with formations adapted to engage with mating formations on the hose clip, the handle being adapted to engage a fulcrum provided on the hose clip and upon reciprocation of the handle to tighten the hose clip around a hose through the engagement of the formations on the lever with mating formations on the hose clip, the end portion on which the formations are provided being circularly curved and having its radius of curvature coinciding with the fulcrum.

References Cited

UNITED STATES PATENTS

| 1,690,643 | 11/1928 | Lavender. |
| 1,751,823 | 3/1930 | Lampert. |
| 1,965,207 | 7/1934 | Walker. |
| 3,027,128 | 3/1962 | Liberty. |

FOREIGN PATENTS 246,586   2/1926   Great Britain.

DONALD A. GRIFFIN, Primary Examiner